United States Patent [19]

Panken

[11] 4,005,237
[45] * Jan. 25, 1977

[54] NON-BLEED PRE-PRINTED SPIRIT DUPLICATING MASTERS

[75] Inventor: Irving Panken, Dayton, Ohio

[73] Assignee: The Mazer Corporation, Dayton, Ohio

[ * ] Notice: The portion of the term of this patent subsequent to June 8, 1993, has been disclaimed.

[22] Filed: Mar. 25, 1976

[21] Appl. No.: 670,427

Related U.S. Application Data

[63] Continuation-in-part of Ser. No. 490,979, July 23, 1974, Pat. No. 3,962,526.

[52] U.S. Cl. ................................ 428/195; 106/22; 106/31; 282/27.5; 427/144; 428/207; 428/211; 428/421; 428/488; 428/914
[51] Int. Cl.² ......................................... B41M 5/04
[58] Field of Search ........... 427/144, 152; 428/195, 428/206, 207, 211, 474, 488, 914, 421, 422; 282/27.5; 101/469, 472, 473; 106/22, 31

[56] References Cited

UNITED STATES PATENTS

| | | | |
|---|---|---|---|
| 2,324,671 | 7/1943 | Bernstein | 106/30 |
| 2,732,795 | 1/1956 | Brandt et al. | 117/35.6 |
| 2,748,024 | 5/1956 | Klimkowski et al. | 117/36.2 |
| 2,824,812 | 2/1958 | Drautz | 106/14.5 |
| 3,036,924 | 5/1962 | Newman | 117/35.6 X |
| 3,446,646 | 5/1969 | Terry | 117/35.6 |
| 3,459,581 | 8/1969 | Newman | 117/36.4 X |
| 3,619,157 | 11/1971 | Brinckman | 117/35.6 X |
| 3,730,091 | 5/1973 | Gaynor | 101/473 |
| 3,962,526 | 6/1976 | Panken | 428/488 |

*Primary Examiner*—Thomas J. Herbert, Jr.
*Assistant Examiner*—Bruce H. Hess
*Attorney, Agent, or Firm*—Biebel, French & Nauman

[57] ABSTRACT

The spirit duplicating masters are pre-printed on a sheet having an oleophobic surface and utilizing, if desired, a non-bleed, non-smear ink composition. The result is a pre-printed master having no problems with bleed, smear or registry. Such pre-printed masters may be formed into booklets.

7 Claims, No Drawings

NON-BLEED PRE-PRINTED SPIRIT DUPLICATING MASTERS

CROSS-REFERENCE TO RELATED APPLICATIONS

This application is a continuation-in-part of application Ser. No. 490,979, filed July 23, 1974, now U.S. Pat. No. 3,962,526 and assigned to the same assignee as the present invention.

BACKGROUND OF THE INVENTION

This invention relates to masters for spirit duplication systems, and more particularly, to non-bleed pre-printed spirit duplicating masters.

With the ever increasing work load on teachers and instructors, it becomes important to use modern technology to relieve the teachers of some of the duties ordinarily undertaken. One tool of frequent use by educators is spirit duplication for producing copies of tests and instructional materials. Conventionally, the instructor types a master from a transfer sheet having coated on the surface thereof a hectographic ink. U.S. Pat. No. 2,748,024 to Klimkowski; U.S. Pat. No. 2,824,812 to Drautz, and U.S. Pat. No. 3,036,924 to Newman, disclose examples of ink compositions which are coated onto transfer sheets for use in a hectographic duplication process. As illustrated in Klimkowski, the image is formed in reverse on a master by transfer from the carbon-type transfer sheet. While Klimkowski discloses use of diazo salt-color former systems, the ink used on such transfer sheets typically contains a wax, a mineral oil and/or fatty acid, a petrolatum, and a dye such as crystal violet.

It has been found that it is also possible to pre-print masters with ink compositions of this type so that the teacher can use such pre-printed masters to make copies for students on a given subject without having to compose the assignment itself. That is, the spirit duplicating ink is reverse printed directly onto the back side of a sheet to form a master, rather than being made by a transfer technique at the time of teacher test preparation. However, in spirit duplicating masters the ink may tend to bleed through the paper to the front surface giving a "halo" effect to the image on the front surface. This is particularly critical in the pre-printed master field since such masters are mass printed months or even years in advance of use and, thus, must be stored for long periods of time. The longer the period of storage, with changes in humidity and temperature taking place during this time, the more chance of a "halo" occurring. Under some circumstances the "halo", if severe enough, renders the sheet aesthetically undesirable or it may even be considered unacceptable because the printing on the front side of the sheet is obscured and rendered unreadable by the "halo".

At present one solution to the "halo" effect is to attempt to obtain as close a registry as possible between the printing on the front surface and the spirit duplicating ink reverse printed on the back side. However, registry is difficult to obtain and even then most of the "halo" problem still exists. In my copending application Ser. No. 490,979, I have disclosed that a more effective solution would be to prevent bleed in the first place.

In addition, known spirit duplicating inks tend to smear and transfer when rubbed and on the application of pressure. Generally a protective tissue layer is used to prevent unintentional transferring and smearing in this manner. If pre-printed masters are used, it is also necessary to use some form of protective device such as individual envelopes, a protective overcoat, or protective tissue sheets.

The necessity of protective tissue sheets is even more evident if a booklet of pre-printed masters is prepared since there is always the danger of transfer of spirit-duplicating ink from the back side of one master to the front of the underlying master. With today's ever increasing cost of paper the use of interspersed tissue layers in such booklets represents a considerable cost factor.

Accordingly, the need exists for pre-printed spirit duplicating masters which do not bleed. While the problem of smearing and bleeding has long been recognized (see, e.g., Drautz, col. 1, lines 14–20), a satisfactory solution has not been yet found. No known spirit-duplicating ink, particularly one capable of being pre-printed on masters, will overcome these problems. Likewise, even though non-bleeding materials, such as cetyl alcohol, are known and have been used in printing inks (see, e.g., Bernstein, U.S. Pat. No. 2,324,671), their only use has been only to reduce the rate of evaporation of the ink composition in a solvent printing process.

Thus, a pre-printed spirit duplicating master which will not bleed or smear is needed in such areas as pre-prepared instructional material.

SUMMARY OF THE INVENTION

In accordance with the present invention, there is provided a pre-printed spirit duplicating master which is non-bleeding, and overcomes the problems of prior art systems in terms of registry. The instant invention involves the use of an oleophobic resinous barrier material treatment on the front surface of a paper sheet (giving the sheet a grease resistant kit test rating of three or more) from which a pre-printed spirit duplicating master is to be prepared. If desired, a non-bleed ink composition may be pre-printed onto the masters and the masters collated into a booklet free of cumbersome and expensive protective layers.

The masters in the booklet may be joined with other materials or inserts such as records, film strips, transparencies, etc., and is bound along at least one edge by any conventional technique. Perforations may be used to facilitate easy removal of the individual masters from the booklet.

Such a booklet may, for example, be arranged by topic. In this way, when the class reaches a point where a quiz, exam or particular work lesson is appropriate, the teacher need only extract the particular individual pre-printed spirit duplicating master from the booklet and prepare copies for the intended instructional use.

Of course, the non-bleed pre-printed masters of the present invention need not be formed into a booklet, but may be used individually. In addition, they need not be used solely in the educational field, but can be prepared any time hectographic copies are desired on a predetermined subject matter.

While the pre-printed masters utilizing the non-bleed ink do not require a box, envelope or protective layer, as is true with the prior art masters, one may be desirable for packaging or storage purposes or may be desired when an ordinary spirit duplicating ink is used. When used, the box, envelope or protective layer provides an additional protective layer or covering.

The present invention is a pre-printed spirit duplicating master which has an oleophobic resinous barrier material coated surface. When the masters are to be formed booklets the oleophobic coating on the front side will help prevent transfer of the ink from the back side of one master to the adjacent front surface of the adjoining master. Additionally, an oleophobic paper prevents bleeding of the ink from the back side, through the paper, and on to the front of that master so that no "halo" is seen. This means that registry is no longer of concern. Such oleophobic papers, which are still receptive to printing inks as well as the spirit duplicating ink of the present invention, are well known but to my knowledge have not been used in the past for pre-printed spirit duplicating masters.

The non-bleed masters of the present invention may be pre-printed with either an ordinary spirit duplicating ink or a non-bleed ink such as that which is the subject matter of the parent application. That latter ink includes a material such as cetyl alcohol in place of the fatty acids and oils generally used to solubilize the dyes. Cetyl alcohol is solid (melting point =50° C) and non-bleeding at room temperature, but is soluble in spirit duplicating fluids for purposes of duplication. It also solubilizes the crystal violet dye used.

This improved spirit duplicating ink, which is disclosed in parent application Ser. No. 490,979, has a markedly reduced percentage of oils from prior art systems, and so is rendered non-bleeding and non-smearing. Even if small amounts of conventional dye solubilizers are used, these do not adversely affect the non-bleeding properties of the paper due to the larger-than-usual amounts of waxes present. Such waxes help contain the dye solubilizers. The only oil-type materials contemplated are a small amount of wetting agent, such as lecithin and small amounts of dye solubilizers. In addition to the cetyl alcohol, wetting agent or dye solubilizer and crystal violet dye, a carnauba wax, a soft wax such as spermacetti or candelilla, and filler materials are used in the ink formulation.

Still, with use of treated paper substrates for preparing masters in accordance with the present invention non-bleed inks of the type disclosed in the parent application are not, as there, absolutely required. In fact, costs and duplicating ability, may lead one to prefer to use oil-containing spirit duplicating inks since the oleophobic treated paper alone will prevent back side-to-front surface bleed through.

Accordingly, it is an object of the present invention to provide a pre-printed spirit duplicating master which will not bleed.

Another object of the present invention is to prepare non-bleed pre-printed masters formed into booklets for instructional use.

Other objects and advantages of the invention will be apparent from the following description and the appended claims.

DESCRIPTION OF THE PREFERRED EMBODIMENTS

In a pre-printed master for use in educational testing, the front surface may be printed in typical fashion (for example, by offset printing) with a positive image, i.e., the test questions as well as instructional material for the teacher's use. On the back side a reverse image of the material to be duplicated (i.e., the test questions) is printed directly thereon.

In the preferred embodiment of the present invention, the images on the front surface are printed on a sheet which has been rendered oleophobic by a treatment with a fluorocarbon material such as Scotchban Brand Paper Protector FC-807 from Minnesota Mining and Manufacturing Company of St. Paul, Minnesota.

This water-based material is coated (at preferably 0.1–0.3% solids) onto bond paper, preferably having a weight 48–60 lbs/ream (3300 sq. ft.). The optimum coat weight is 0.03–0.1 lbs. per thousand square feet (25–30 gm/sq/m). With higher coat weights pigments and opacifiers such as titanium dioxide, kaolin, etc., binders such as styrenebutadiene, acrylics, and polyvinyl acetate, etc., and other minor amounts of additives such as lubricants, fungicides, defoamers, etc., may be used. The coated sheet is then dried to remove the water. Alternatively, the fluorocarbon may be impregnated into the paper or the fluorocarbon treatment may be made as an internal (wet end) treatment during the paper manufacture itself. In either event, the resultant sheet should have a "kit test" rating of 3+ and preferably 7+.

The "3-M kit test" is prepared and performed as follows:

Twelve solvent-oil mixtures are prepared according to Table I below. Test specimens of paper (at least 2 × 2 inches) are placed on a clean flat surface, test side up. A drop of test solution from an intermediate Kit Number is dropped on the test area from a height of about one inch. Exactly, fifteen seconds after the drop is applied, excess fluid is removed with a clean swatch of cotton or tissue. The wetted area is immediately examined. Failure is evidenced by a pronounced darkening of the specimen caused by penetration. Upon failure, the test is repeated with a lower Kit Number solution. The "kit test" rating is the highest numbered solution that stands on the surface of the specimen for 15 seconds without causing failure.

TABLE I

| Kit Number | Volume Castor Oil ml. | Volume Toluene ml. | Volume Heptane ml. |
|---|---|---|---|
| 1 | 200 | 0 | 0 |
| 2 | 180 | 10 | 10 |
| 3 | 160 | 20 | 20 |
| 4 | 140 | 30 | 30 |
| 5 | 120 | 40 | 40 |
| 6 | 100 | 50 | 50 |
| 7 | 80 | 60 | 60 |
| 8 | 60 | 70 | 70 |
| 9 | 40 | 80 | 80 |
| 10 | 20 | 90 | 90 |
| 11 | 0 | 100 | 100 |
| 12 | 0 | 90 | 110 |

Likewise, the treated paper, through pigmentary or otherwise, should have an opactiy matching that of typical printing paper. An opacity of 90% or more in Reflectometer reading is especially preferred. It should also be printable by offset printing using typical printing inks. Finally, the treated paper should be resistant to the fluid or "spirit" used in spirit duplicating.

Scotchban FC-807 treated papers in the desired 40–50 lb/ream (3300 sq. ft.) and having 3+ kit test rating, available from Fort Howard Paper Co. of Green Bay, Wisconsin, and others meeting these criteria may be used. Likewise, melamine, silicone or other oleophobic material treated papers having these characteristics may also be used. The reverse image of that portion of the printing on the front surface which is to be duplicated is pre-printed directly on the back side of such treated sheets. Offset rotogravure, letterpress, stencilling or aniline printing techniques may be used to do the preprinting. Exact registry between the printing on the front surface and the reverse image on the back side is not required.

A preferred hot melt ink formulation such as that disclosed in parent application Ser. No. 490,979 is generally as follows:

| Ingredients | Weight Percentage |
| --- | --- |
| Wetting agent | 0–1 |
| Cetyl alcohol | 5–25 |
| Wax | 31–48 |
| Dye | 35–45 |
| Filler | 7–12 |
| Dye Solubilizer | 0–10 |

The wetting agent may be an emulsifier such as lecithin. The wax is a mixture of carnauba wax and a soft wax such as spermacetti or candelilla. The dye may be crystal violet of the type ordinarily used in spirit duplicating ink compositions; although, the higher-solubility grades are preferred. Included as possible fillers are attapulgite clay and fused silica such as Silanox, manufactured by the Cabot Corp. The dye solubilizer may be conventional fatty oils or other known solubilizers.

Paper sheets (50 lb/ream (3300 sq. ft. weight)) treated on the front surface to render them oleophobic (a fluorocarbon one-side treated paper from Fort Howard Paper Co. were offset printed on the front surface, and then were hot-melt reverse-printed directly on the back side with a non-bleed spirit duplicating ink of the formulas given in the following examples:

| Example I | |
| --- | --- |
| Ingredient | Weight Percentage |
| Wetting agent | 0.5 |
| Cetyl alcohol | 13.0 |
| Carnauba wax | 37.0 |
| Spermacetti wax | 7.0 |
| Crystal violet | 35.0 |
| Attapulgus clay | 6.5 |
| Silanox | 1.0 |
| | 100.0% |

| Example II | |
| --- | --- |
| Ingredients | Weight Percentage |
| Wetting agent | 0.5 |
| Cetyl alcohol | 9.0 |
| Carnauba wax | 37.5 |
| Spermacetti wax | 7.0 |
| Crystal violet | 35.0 |
| Attapulgus clay | 10.0 |
| Silanox | 1.0 |
| | 100.0% |

| Example III | |
| --- | --- |
| Ingredients | Weight Percentage |
| Wetting agent | 0.5 |
| Cetyl alcohol | 5.0 |
| Carnauba wax | 37.5 |
| Spermacetti wax | 7.0 |
| Crystal violet | 40.0 |

| Example III -continued | |
| --- | --- |
| Ingredients | Weight Percentage |
| Attapulgus clay | 9.0 |
| Silanox | 1.0 |
| | 100.0% |

Oleophobic treated papers of the same type printed in Examples I–III, were also reverse-printed with an oil-containing spirit duplicating ink as in the following example:

| Example IV | |
| --- | --- |
| Ingredient | Weight Percentage |
| Carnauba wax | 21 |
| Mineral oil | 13 |
| Fatty acid | 6 |
| Petrolatum | 5 |
| Crystal violet | 55 |
| | 100% |

In all cases the pre-printed masters of the above examples were tested for smear, storability, bleed, and duplicating capabilities and found to be acceptable in all respects.

In Examples I–III, the color intensity after a large number of copies had been run was found not to be as great as in the prior art systems. However, as a trade-off for this slight loss of color, it was found that the "halo" effect and smear experienced was markedly reduced. Further, the pre-printed masters of Examples I–III were formed into booklets of masters without the need for any interleaved protective tissue. It was observed that little or no transfer of the spirit duplicating ink occurred from one master to the adjacent master.

The master of Example IV, which utilized an ink typical of spirit duplicating inks, had some tendency to smear and so required a protective tissue. However, duplicating capabilities were better than those of Examples I–III. In addition the problems of bleed through the paper, "halo", registry, etc. were overcome as effectively.

While the articles herein described constitute preferred embodiments of the invention, it is to be understood that the invention is not limited to these precise articles, and that changes may be made therein without departing from the scope of the invention which is defined in the appended claims.

What is claimed is:

1. A non-bleed pre-printed spirit duplicating master comprising:
   a. a substantially opaque paper sheet having a front surface and a back side,
   b. said paper sheet having an oleophobic resinous barrier material treated front surface to give said sheet a kit test rating of three or more,
   c. a positive image printed on the front surface and overlying said oleophobic resinous barrier material, and
   d. a hot melt spirit duplicating ink reverse printed directly on said back side so as to form a pre-printed master.

2. A non-bleed pre-printed spirit duplicating master as set forth in claim 1 wherein said spirit duplicating ink comprises 5–25% cetyl alcohol, 31–48% wax, and 35–45% crystal violet.

3. A non-bleed pre-printed spirit duplicating master as set forth in claim 1 wherein said oleophobic resinous barrier material is a fluorocarbon material.

4. A booklet of non-bleed pre-printed spirit duplicating masters comprising
1. a plurality of pre-printed masters each having:
   a. a substantially opaque paper sheet having a front surface and a back side,
   b. said paper sheet having an oleophobic resinous barrier material treated front surface to give said sheet a kit test rating of three or more,
   c. a positive image printed on the front surface and overlying said oleophobic resinous barrier material, and
   d. a hot melt spirit duplicating ink reverse printed directly on said back side so as to form a pre-printed master,
2. said plurality of pre-printed masters being bound along one edge to form said booklet.

5. A booklet of non-bleed pre-printed spirit duplicating masters as set forth in claim 4 wherein said booklet is tissueless and said spirit duplicating ink comprises 5–25% cetyl alcohol, 31–48% wax, and 35–45% crystal violet.

6. A booklet of non-bleed pre-printed spirit duplicating masters as set forth in claim 4 further including protective tissue layers inserted between said pre-printed masters and bound in said booklet.

7. A booklet of pre-printed spirit duplicating masters as set forth in claim 4 wherein said oleophobic resinous barrier material is a fluorocarbon material.

* * * * *